United States Patent [19]
Blädel et al.

[11] Patent Number: 5,232,746
[45] Date of Patent: Aug. 3, 1993

[54] POWDER COATING PROCESS EMPLOYING FLUORINATED THERMOPLASTICS IN ADMIXTURE WITH POTASSIUM TITANATE FIBERS

[75] Inventors: Hermann Blädel, Burgkirchen; Hans-Jürgen Hendriock, Weiterstadt, both of Fed. Rep. of Germany

[73] Assignee: Hoechst AG, Frankfurt, Fed. Rep. of Germany

[21] Appl. No.: 628,580

[22] Filed: Dec. 17, 1990

[30] Foreign Application Priority Data

Dec. 19, 1989 [DE] Fed. Rep. of Germany ....... 3941849

[51] Int. Cl.$^5$ .............................................. B05D 1/06
[52] U.S. Cl. ..................................... 427/470; 427/318; 427/409; 427/461; 427/474; 427/486; 524/413
[58] Field of Search ............ 427/25, 27, 29, 318, 427/409, 485, 486, 459, 461, 470, 474; 524/413; 252/520

[56] References Cited

U.S. PATENT DOCUMENTS

| | | | |
|---|---|---|---|
| 2,841,470 | 7/1958 | Berry | 423/598 |
| 4,107,356 | 8/1978 | Ukihashi et al. | 427/195 |
| 4,180,609 | 12/1979 | Vassiliou | 428/212 |
| 4,351,882 | 9/1982 | Concannon | 428/422 |
| 4,590,234 | 5/1986 | Tasaka et al. | 524/413 |
| 4,908,225 | 3/1990 | Niimura et al. | 427/25 |
| 4,910,086 | 3/1990 | Kawakami et al. | 428/457 |
| 5,008,042 | 4/1991 | Honda et al. | 252/520 |

FOREIGN PATENT DOCUMENTS

| | | |
|---|---|---|
| 0231001 | 8/1987 | European Pat. Off. . |
| 0258731 | 3/1988 | European Pat. Off. . |
| 0330048 | 8/1989 | European Pat. Off. . |
| 52-5852 | 1/1977 | Japan ....... 427/25 |
| 58-198573 | 11/1983 | Japan ....... 524/413 |
| 60-38452 | 2/1985 | Japan ....... 524/413 |
| 1-29461 | 1/1989 | Japan ....... 252/520 |
| 1092014 | 11/1967 | United Kingdom . |
| 1107161 | 3/1968 | United Kingdom . |

*Primary Examiner*—Terry J. Owens
*Attorney, Agent, or Firm*—Connolly and Hutz

[57] ABSTRACT

Metallic substrates or substrates metallized at at least one surface are electrostatically powder coated with fluorinated polymers processable from the melt in admixture with 0.1 to 4% by weight of potassium titanate fibers.

6 Claims, No Drawings

POWDER COATING PROCESS EMPLOYING FLUORINATED THERMOPLASTICS IN ADMIXTURE WITH POTASSIUM TITANATE FIBERS

The invention relates to a process for electrostatically powder-coating metallic substrates or substrates metallized at at least one surface with a fluorinated polymer processable from the melt.

The formation of fluorinated polymer coatings by the method of electrostatic application of powdered fluorinated polymers to metal substrates is known. In this connection, relatively high layer thicknesses are desired because fluorinated polymers have a certain permeability to gases, liquids and solutions. Such permeation results, however, in corrosion of the metallic substrate and in destruction of the bond between substrate and coating in the case of aggressive substances. Since, however, from a certain layer thickness upwards, the fluorinated polymer coating applied has an electrical insulating action, i.e. the electrostatic attraction is no longer operative and the fluorinated polymer particles added are only melted on, the achievement of high layer thicknesses, in particular also when several layers are applied, is not possible without great difficulty.

An attempt has already been made to eliminate these difficulties in that, according to U.S. Pat. No. 4,107,356, carbon fibers are mixed with the fluorinated polymers which can be processed from the melt so that the conductivity remains intact even for fairly large layer thicknesses. In order to achieve this, however, relatively high proportions of carbon fibers are necessary. This in turn impairs the desired anti-adhesive nature of the fluorinated polymer coating since the fluorinated polymer is to a certain extent "diluted" in this way. Such mixtures are also sensitive to oxidation and oxidizing agents, in particular at the high temperatures which prevail on baking such coatings. Thus, it may be necessary to process mixtures of carbon fibers and refractory fluorinated polymers under inert gas. Finally, it is unsatisfactory for aesthetic reasons that said coatings are only available in black.

From European Published Specification 258,731 it is known to produce powder coatings processable from the belt in multi-layer application in a manner such that the last layer deposited in each case has a lower melting point and/or a higher flowability than the layer lying underneath it. This keeps the layer melted in a particular case during baking below that thickness at which running off of the melt due to gravity takes place. In this way higher layer thicknesses can be achieved, but the process is somewhat elaborate and can be carried out only with at least two fluorinated polymers which differ in flowability and/or melting point.

Furthermore, it is known from European Published Specification 330,048 to achieve higher layer thicknesses if in the powder coating a mixture of 15 to 65% by volume of glass beads are used with the fluorinated polymer to form the basic layer and at least one top layer is then deposited. Here again it is the case that the relatively high proportion of glass beads has a disturbing effect on the properties desired for the fluorinated polymer coating. In addition, since the top layers are composed of fluorinated polymers without glass beads added, at least two different mixtures are necessary to form the entire coating.

There remains therefore a need for a simple-to-handle process which makes it possible to achieve high layer thicknesses.

This is achieved according to the present invention by a process of the type mentioned in the beginning which comprises carrying out the powder coating with a mixture composed of the fluorinated polymer processable from the melt and comprising 0.1 to 4% by weight of potassium titanate fibers, based on the fluorinated polymer.

The potassium titanate fibers used in the process according to the invention in a blend with fluorinated polymers processable from the melt are known. These are single crystals of potassium tetratitanate, potassium hexatitanate and preferably, potassium octatitanate. The preparation of potassium titanate fibers is known, for example, from U.S. Pat. No. 2,841,470. Mixtures of potassium titanate fibers with fluorinated polymers processable from the melt are also known from U.S. Pat. No. 4,590,234 in which such mixtures are described for injection moulding, melt extrusion and similar deformation methods, or from GB Patent Specifications 1,092,014 and 1,107,161, in which aqueous dispersions of such fluorinated polymers containing mineral fibers which have been pre-treated with surface-active agents are described. Such dispersions are used for coating metallic substrates from the liquid phase. In all of the publications mentioned, no indication is found of the use of such mixtures in powder coating. The proportions of the mineral fibers in said mixtures are also appreciably higher.

The potassium titanate fibers used in the process according to the invention have a mean fiber length of 5 to 1000, preferably of 10 to 100 $\mu$m and a mean fiber diameter of 0.1 to 2, preferably of 0.2 to 0.5 $\mu$m. The mean fiber length/mean fiber diameter ratio is 50 to 500, preferably 50 to 200.

The fluorinated polymers processable from the melt and used within the scope of the process according to the invention normally have a melt viscosity of $\leq 1 \cdot 10^6$ Pa s at the processing temperature. Such thermoplastic fluorinated polymers processable from the melt may be, for example, homopolymers such as polyvinylidene fluoride, polyvinyl fluoride or preferably, polychlorotrifluoroethylene. They may also be copolymers, preferably those which contain, in addition to copolymerized units of tetrafluoroethylene or chlorotrifluoroethylene at least one further ethylenically unsaturated co-monomer in sufficient quantity in order to ensure the processability from the melt. Such copolymers are selected, in particular, from the following groups:

a) Copolymers of tetrafluoroethylene with higher perfluoroolefins containing 3 to 10 carbon atoms, in particular with hexafluoropropylene; copolymers of tetrafluoroethylene with perfluoroalkyl perfluorovinyl ethers of the formula $CF_2=CF-ORf$, where Rf is a perfluorinated alkyl radical containing 1 to 10 carbon atoms, preferably with perfluoropropyl perfluorovinyl ether. Copolymers of tetrafluoroethylene which contain both hexafluoropropylene and also one of the said perfluoroalkyl perfluorovinyl ethers, in particular perfluoropropyl perfluorovinyl ether;

b) Copolymers of tetrafluoroethylene with ethylene, such copolymers preferably containing at least one further copolymerizable monomer, frequently also two or more of them. Such comonomers are preferably selected from the group comprising the perfluorinated olefins, hexafluoropropylene being preferred; from the group comprising perfluoroalkyl perfluorovinyl ethers of the above specified formula, perfluoropropyl perfluorovinyl ether being preferred; from the group comprising the fluorine-containing olefins, preferably 3,3,3-trifluoro-2-trifluoromethylpropylene; from the group comprising vinyl esters and also from the group comprising vinylidene fluoride and trifluorochlorethylene.

Such copolymers of the tetrafluoroethylene/ethylene type, optionally with further monomers, are composed of not more than 60 mole-% tetrafluoroethylene, 60 to 40 mol-% ethylene and 0 to 10 mol-% of the proportion of the said third and optional fourth and further monomers;

c) Copolymers of tetrafluoroethylene with vinylidene fluoride, such copolymers containing preferably also at least one further, ethylenically unsaturated, preferably fluorine-containing comonomer; in particular, suitable for this purpose, is hexafluoropropylene or a perfluoroalkyl perfluorovinyl ether, optionally also the combination of the two; thermoplastic copolymers of this type which are processable from the melt contain tetrafluoroethylene in proportions of 50 to 80, in the case of ter- and quaterpolymers, of 50 to 65 mol-%, and vinylidene fluoride in proportions of more than 20 mol-%; a preferred combination is tetrafluoroethylene/vinylidene fluoride/hexafluoropropylene;

d) Copolymers of tetrafluoroethylene with chlorotrifluoroethylene, it being possible for both tetrafluoroethylene and also chlorotrifluoroethylene to be the predominant constituent;

e) Copolymers of chlorotrifluoroethylene with ethylenically unsaturated fluorine-containing monomers such as, in particular, hexafluoropropylene, tetrafluoroethylene and vinylidene fluoride;

f) Copolymers of chlorotrifluoroethylene with ethylene, it also being possible for these copolymers to contain preferably at least one further, frequently also two or three further, ethylenically unsaturated comonomers which are selected from the same groups as is specified for copolymers of the tetrafluoroethylene/ethylene type.

In relation to the preparation of copolymers of the abovementioned type, reference is made, for example, to the following U.S. Pat. Nos.: 2,946,763, 3,132,123, 3,132,124, 4,029,868, 4,262,101, 3,624,250, 3,859,262, 3,817,951, 3,960,825, 3,847,881, 4,123,602, 2,468,054, 3,235,537, 2,513,312, 2,662,072, 3,053,818, 2,738,343, 2,752,332; and furthermore to the European Patents No. 2,809 and 50,437 and the Belgian Patent No. 844,965.

The potassium titanate fibers can be blended with the powdered fluorinated polymer processable from the melt whose mean particle size should be 5 to 400, preferably 30 to 200 μm, in any standard powder mixing apparatus which is suitable for producing homo-geneous mixtures, for example in a fluid mixer, drum mixer or dry-blend mixer.

However, it is also possible to start from an aqueous dispersion, optionally a colloidal dispersion, of the intended fluorinated polymer which is provided with a wetting agent and can be concentrated, and to stir the potassium titanate fibers homogenously into the latter. The mixture obtained can then be stirred further or a standard coagulating agent for fluorinated polymer dispersions is added or both measures are taken. After complete coagulation, the mixture is dried and if necessary, ground.

The electrostatic powder-coating is a process known in every detail for providing a metallic substrate or a substrate having at least one metallic surface (for example a metallized high-temperature-resistant plastic film or plate or a metal-coated ceramic or glass plate) situated on the coating side with a polymer coating. Any desired metal which is not damaged at the baking temperature of the fluorinated polymer used in the particular case, for example, steel, stainless steel, iron, aluminum, copper, nickel, chromium or, alternatively, an alloy such as brass, can act as metallic substrate.

Optionally, the substrate can be pre-heated to temperatures which are 20° to 80° C. above the melting point of the fluorinated polymer used in a particular case in order to achieve flow of the layer even during the coating operation. For the purpose of coating, the substrate, in practice usually the entire molding to be coated is usually connected as earth and the powder mixture to be applied is charged up positively or negatively either by frictional charging or, in the case of negative charging, also by a negatively charged electrode which can be, for example, situated as a ring in the powder spray apparatus used for the application. The term "electrostatic powder coating" should also be understood here to mean the method of electrostatic fluidized bed coating in which the substrate and the powder are charged up in the same way and then coated in a fluidized bed. Quite generally, this term encompasses all the processes in which powder coating is carried out by means of applied electrostatic forces.

Following the coating operation, the coated substrates are baked at temperatures which are 20° to 80° C. above the melting point of the fluorinated polymer used in a particular case, with the layer melting and flowing.

Before the actual coating operation, the surface to be coated is degreased by standard methods, for example by vapour-phase degreasing, treatment in alkaline baths or possibly, also by heating the object to be coated to approximately 400° to 450° C.

An improvement of the adhesion of the coating can be achieved by roughening the base, for example by sand blasting or etching, optionally also by applying ceramic or metallic intermediate layers having high surface roughness, for example by flamespraying or plasma coating. If very high requirements are imposed on the adhesion of the coating, an adhesion-promoting layer which is normally composed of the same fluorinated thermoplastic with adhesion-promoting substances added may also be applied before the application of the fluorinated polymers blended with potassium titanate fibers. Suitable adhesion promoters for such fluorinated thermoplastics are high-temperature-resistant binder resins such as epoxy resins, polyamides, polyamidoimides, polyimides, polytriketoimidazolidines, polyphenylene sulfides, polyether sulfides, polyether ketones, polyhydantoins, or alternatively, inorganic substances such as, for example, alkali metal silicates, chromic anhydride, phosphoric acid or aluminum chlorophosphates. The adhesion-promoting layer is deposited as a powder by the standard powder coating methods or, alternatively, in the form of dispersions, suspensions or solutions by spraying, immersion or brushing. After the application, the adhesion-promoting layer is optionally dried and baked.

By repeatedly applying and baking, layer thicknesses can thereby be obtained which are twice to three times as great as with the same fluorinated polymer powder not provided with potassium titanate fibers, no flowing-off of the coating taking place in the process.

It is surprising that the behavior of the potassium titanate fiber in the electrostatic field during the powder coating can lead to such a pronounced effect with respect to the achievable layer thickness with such a small quantity. In addition, the coatings produced by the process according to the invention exhibit a high resistance to chemicals, an extremely low permeability to water, steam and solvent vapors and a high weather resistance.

If a particularly smooth surface is desired, one or more top layers composed of a fluorinated polymer processable from the melt without potassium titanate fiber added can finally also be deposited. In contrast to the mixtures filled with glass beads of European Published Specification 330,048, this is not in this case, however, absolutely necessary. The top layer or the top layers are composed preferably of the same fluorinated polymer material which is also contained in the mixture of the layers situated underneath, but this is not absolutely necessary. If a plurality of top layers is deposited, they may be composed of the same or even of different fluorinated polymers. In this connection, use may optionally be made of the process of European Published Specification 258,731, i.e, a plurality of layers is applied which are composed in the outward direction of fluorinated polymers having gradually lower boiling point or higher flowability.

Both the base and also the top layers can be provided with standard reinforcing fillers or colored with pigments. Such reinforcing fillers or pigments are, for example, glass fibers, carbon black, titanium dioxide, iron oxide, chromium oxide, cobalt blue, antimony trioxide, cadmium sulfide or cadmium selenide or, alternatively, high-temperature-resistant organic pigments.

The process according to the invention is suitable for coating metal objects or objects having metallic surfaces of all types. In particular, it is applied to coating or lining apparatuses or parts which are exposed to corrosive attack by gases, liquids or solids, for example stirred kettles, reaction vessels, storage tanks, pipes, conveyor belts, stirring devices and the like.

The invention is illustrated by the following examples:

EXAMPLE 1

A steel sheet (dimensions 100×30×0.5 mm) is first degreased by heating to 450° C. and then superficially roughened by sand blasting. An adhesion-promoting layer which is composed of a solution of polyamidoimide in N-methylpyrrolidone/xylene with the addition of a copolymer of tetrafluoroethylene, ethylene and hexafluoropropylene (composition 66% by weight tetrafluoroethylene, 16% by weight ethylene, 18% by weight hexafluoropropylene; polyamidimide: copdlymer ratio by weight=1 : 1) and 20% by weight, based on the total polymer content, of black iron oxide is then applied by spraying. This adhesion-promoting layer is dried at 150° C. and baked at 260° C. The layer thickness is 30 μm.

The steel sheet still at 260° C. is earthed. A copolymer (same composition as in the adhesion promoter) having a mean particle size of 65 μm and premixed with 1% by weight, based on copolymer, of potassium octatitanate fiber having a mean length of 15 mm, a mean diameter of 0.2 mm and a length/diameter ratio of 75 which is charged up with a voltage of 90 kV is then deposited on the substrate by means of an electrostatic powder spraying gun and the layer is baked at 260° C. in a furnace for 10 minutes. A further layer is then sprayed onto the still hot layer in the manner described. Before a slight flowing-off is detectable, a total of seven sublayers can be built up into a multilayer coating whose total thickness is 3000 μm and the thickness of the individual layers is consequently on average about 430 μm. If the same experiment is repeated without adding potassium titanate, a total thickness of 1500 μm and a mean layer thickness of the individual layers of 250 μm is only achieved with six individual layers.

EXAMPLE 2

A steel sheet (dimensions 100×30×1 mm) is subjected to a base treatment as in Example 1 and then heated to 360° C. without applying an adhesion promoter. The preheated substrate is coated by the same method and with the same apparatus as in Example 1, a powder mixture of a copolymer of tetrafluoroethylene, perfluoropropyl perfluorovinyl ether and hexafluoropropylene (composition 95% by weight tetrafluoroethylene, 1.8% by weight hexafluoropropylene, 3% by weight perfluoropropyl perfluorovinyl ether) containing 0.5% by weight, based on the copolymer, of potassium octatitanate fiber (fiber length, fiber diameter and length/diameter ratio as in Example 1) and also 1% by weight of polyphenylene sulfide as stabilizer being used. The coating is baked for 10 minutes at 360° C. and this operation is repeated four times on the still hot layer before noticeable flowing-off occurs. The total thickness of the layer is 1500 μm and the mean layer thickness of the individual layer is 300 μm. If the same experiment is repeated without the addition of potassium titanate, only a total thickness of 600 μm and a mean layer thickness of the individual application of 75 μm are achieved.

EXAMPLE 3

A steel sheet having the same dimensions as in Example 2 is pre-treated as in Example 1 to prepare the base for the coating. The sheet is preheated to 350° C. without applying an adhesion promoter and coated by the method and with the apparatus of Example 1 with a mixture of a copolymer of tetrafluoroethylene and perfluoropropyl perfluorovinyle the (composition 97% by weight tetrafluoroethylene, 3% by weight perfluoropropyl perfluorovinyl ether and 0.3% by weight potassium octatitanate fiber (dimensions as in Example 1). The baking is carried out at 350° C. for 15 minutes. The operation can be repeated three times without noticeable flowing-off. The total layer thickness achieved is then 2000 μm and the mean layer thickness of the individual layers is 500 μm. In a control experiment without potassium titanate fiber, the total layer thickness is 500 μm and the thickness of the individual layers is 100 μm.

We claim:

1. A process for electrostatically powder-coating with a fluorinated polymer processable from the melt metallic substrates or substrates metallized at at least one surface, which comprises electrostatically applying to the substrates a mixture comprised of a powder of the fluorinated polymer processable from the melt and from 0.1 to 4% by weight of potassium titanate fibers, based on the fluorinated polymer.

2. The process for electrostatically powder-coating as claimed in claim 1, wherein the potassium titanate fibers in the mixture have a length of 5 to 1000 μm.

3. The process for electrostatically powder-coating as claimed in claim 1, wherein the potassium titanate fibers have a diameter of 0.1 to 2 μm.

4. The process for electrostatically powder-coating as claimed in claim 1, wherein the potassium titanate fibers have a mean fiber length/mean fiber diameter ratio equal to 50 to 500.

5. The process for electrostatically powder-coating as claimed in claim 1, wherein an adhesion-promoting layer is applied to the substrate before the application of the powder coating.

6. The process for electrostatically powder-coating as claimed in claim 1, wherein the substrates are preheated to temperatures which are 20° to 80° C. above the melting point of the fluorinated polymer before the powder coating is applied.

* * * * *